(12) United States Patent
Prabhakar et al.

(10) Patent No.: US 12,507,167 B2
(45) Date of Patent: Dec. 23, 2025

(54) STANDALONE MODE PLMN SELECTION

(71) Applicant: Apple Inc., Cupertino, CA (US)

(72) Inventors: Alosious Pradeep Prabhakar, Singapore (SG); Rohit A. Matolia, Bangalore (IN); Vijay Venkataraman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 443 days.

(21) Appl. No.: 17/997,701

(22) PCT Filed: Apr. 30, 2021

(86) PCT No.: PCT/US2021/070495
§ 371 (c)(1),
(2) Date: Nov. 1, 2022

(87) PCT Pub. No.: WO2021/222942
PCT Pub. Date: Nov. 4, 2021

(65) Prior Publication Data
US 2023/0224809 A1 Jul. 13, 2023

(30) Foreign Application Priority Data

May 1, 2020 (IN) .............................. 202041018754

(51) Int. Cl.
*H04W 48/20* (2009.01)
*H04W 48/10* (2009.01)
(52) U.S. Cl.
CPC .......... *H04W 48/20* (2013.01); *H04W 48/10* (2013.01)

(58) Field of Classification Search
None
See application file for complete search history.

(56) References Cited

U.S. PATENT DOCUMENTS

| 9,125,146 | B1 | 9/2015 | Edara et al. | |
| 2015/0103782 | A1* | 4/2015 | Xu | H04W 16/14 370/329 |
| 2016/0219501 | A1* | 7/2016 | Chang | H04W 88/06 |

(Continued)

FOREIGN PATENT DOCUMENTS

| EP | 3614738 | 2/2020 |
| WO | 2019/040708 | 2/2019 |
| WO | 2019/046028 | 3/2019 |

*Primary Examiner* — Nicholas Sloms
(74) *Attorney, Agent, or Firm* — Fay Kaplun & Marcin, LLP

(57) ABSTRACT

A computer readable storage medium comprising a set of instructions to operate a processor, a user equipment (UE) and an integrated circuit configured to perform operations. The operations include receiving a signal broadcast by a cell of new radio (NR) network, determining whether the cell is configured for a standalone (SA) operation for NR based on the received signal, when the cell is configured for the SA operation for NR, storing a first indication locally at the UE that the cell is configured for the SA operation for NR, when the cell is not configured for the SA operation for NR, storing a second indication locally at the UE that the cell is configured for a non-standalone (NSA) operation for NR and initiating a public land mobile network (PLMN) search procedure, wherein the PLMN search procedure includes a frequency scan based on the first indication or the second indication.

20 Claims, 10 Drawing Sheets

(56) References Cited

U.S. PATENT DOCUMENTS

| | | | |
|---|---|---|---|
| 2017/0142645 A1* | 5/2017 | Wu | H04W 48/16 |
| 2019/0069205 A1 | 2/2019 | Lee | |
| 2019/0069229 A1 | 2/2019 | Lee | |
| 2019/0104451 A1* | 4/2019 | Dash | H04W 48/18 |
| 2019/0223091 A1 | 7/2019 | Fu et al. | |
| 2019/0349848 A1* | 11/2019 | Bali | H04W 16/14 |
| 2019/0350018 A1* | 11/2019 | Moosavi | H04W 76/11 |
| 2019/0357095 A1 | 11/2019 | Pakniat et al. | |
| 2020/0359282 A1* | 11/2020 | da Silva | H04W 36/00835 |
| 2020/0359441 A1* | 11/2020 | Yilmaz | H04L 5/0098 |
| 2020/0396751 A1* | 12/2020 | Wei | H04W 48/12 |
| 2021/0084576 A1* | 3/2021 | Zhu | H04W 48/16 |
| 2021/0160774 A1* | 5/2021 | Nagar | H04W 52/028 |
| 2021/0168700 A1* | 6/2021 | Chen | H04W 48/16 |
| 2021/0243624 A1* | 8/2021 | Moosavi | H04W 36/0061 |
| 2021/0266802 A1* | 8/2021 | Arshad | H04W 36/0066 |
| 2021/0344463 A1* | 11/2021 | Bergqvist | H04W 72/21 |
| 2022/0272612 A1* | 8/2022 | Ingale | H04W 48/12 |
| 2022/0417811 A1* | 12/2022 | Xin | H04W 36/06 |

* cited by examiner

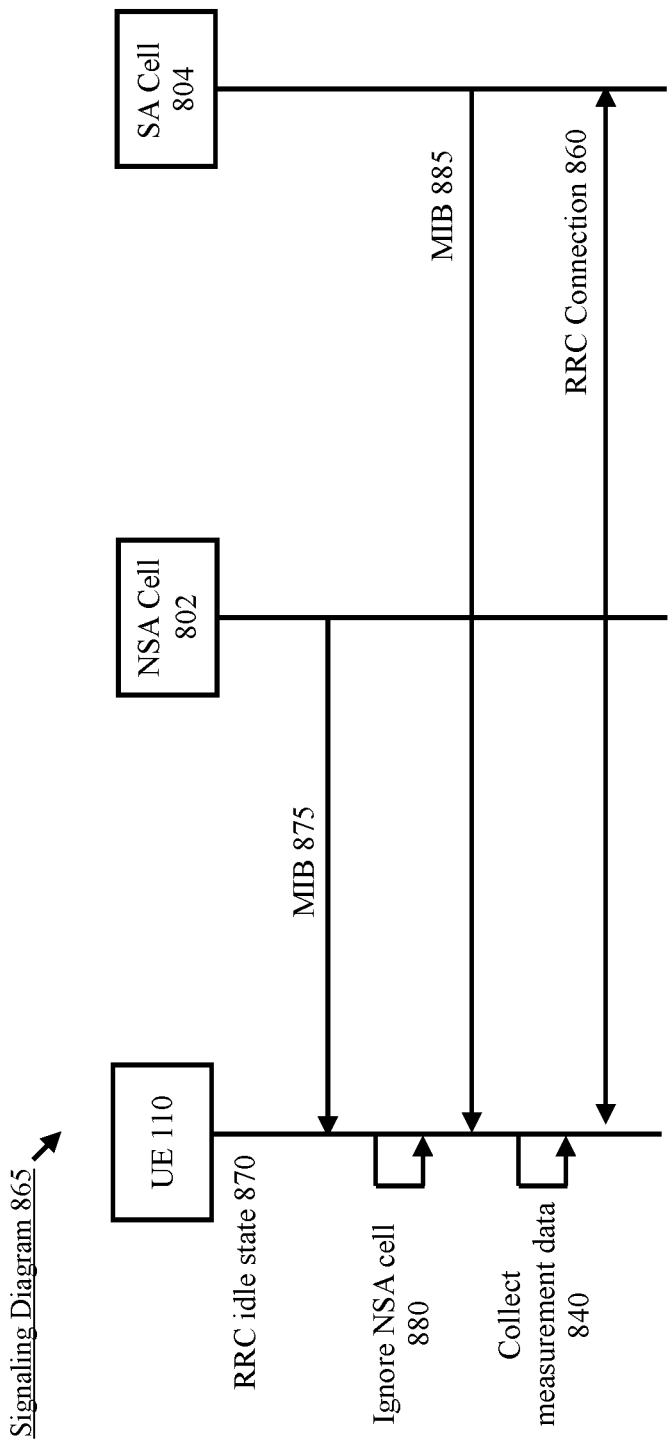

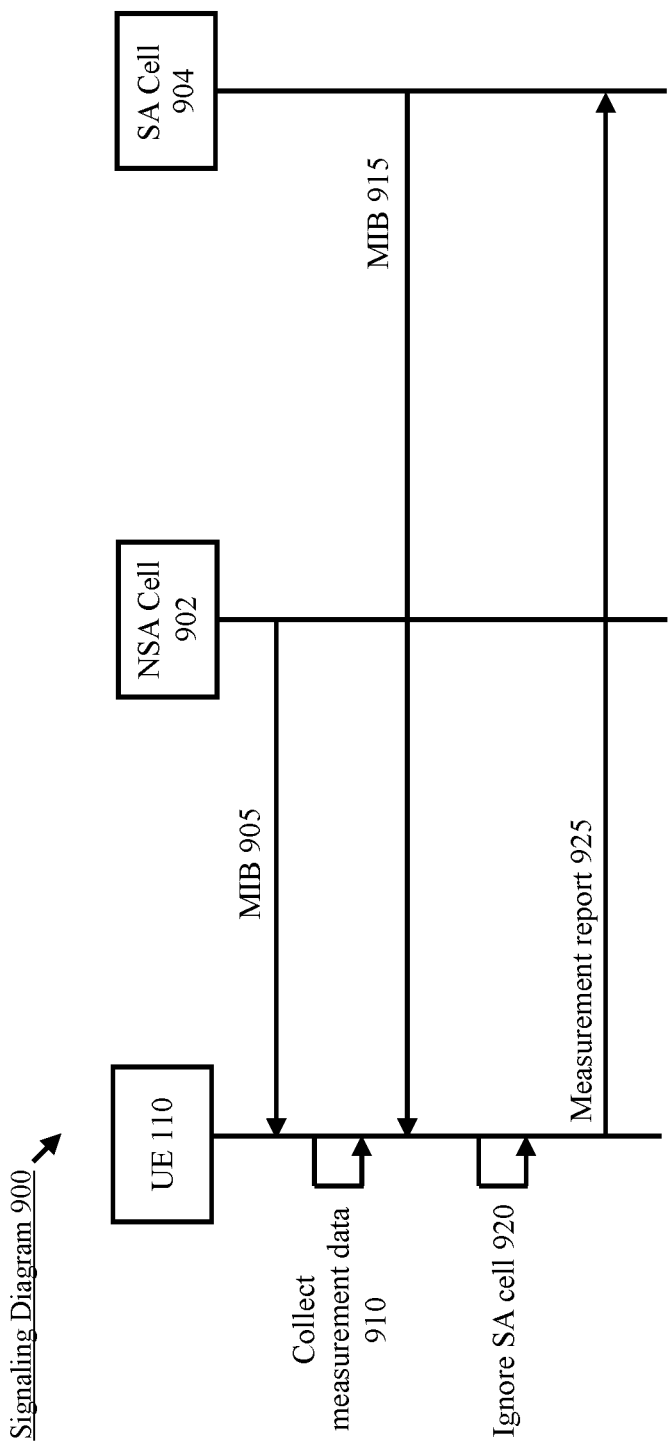

STANDALONE MODE PLMN SELECTION

BACKGROUND

A user equipment (UE) may establish a connection to at least one of multiple different networks or types of networks. To establish the network connection and receive the full scope of services normally available to the UE via the network connection, the UE may select a public land mobile network (PLMN) to camp on. PLMN selection has been identified as a source of latency and inefficiency. For example, the longer it takes the UE to complete the PLMN selection process, the longer it takes the UE to access network services. Further, performing operations associated with PLMN selection may cause the UE to experience a power drain. Accordingly, there is a need for techniques configured to optimize PLMN selection.

SUMMARY

In some exemplary embodiments, a computer readable storage medium comprising a set of instructions, that when executed by a processor of a user equipment (UE) causes the processor to perform operations is provided. The operations include receiving a signal broadcast by a cell of a new radio (NR) network, determining whether the cell is configured for a standalone (SA) operation for NR based on the received signal, when the cell is configured for the SA operation for NR, storing a first indication locally at the UE that the cell is configured for the SA operation for NR, when the cell is not configured for the SA operation for NR, storing a second indication locally at the UE that the cell is configured for a non-standalone (NSA) operation for NR and initiating a public land mobile network (PLMN) search procedure, wherein the PLMN search procedure includes a frequency scan based on the first indication or the second indication.

In other exemplary embodiments, a user equipment (UE) having a transceiver and a processor is provided. The transceiver is configured to communicate with one or more networks. The processor is configured to perform operations that include receiving a signal broadcast by a cell of a new radio (NR) network, decoding the signal to determine whether the cell is configured for a standalone (SA) operation for NR, when the cell is configured for the SA operation for NR, storing a first indication locally at the UE that the cell is configured for the SA operation for NR, when the cell is not configured for the SA operation for NR, storing a second indication locally at the UE that the cell is configured for a non-standalone (NSA) operation for NR and initiating a public land mobile network (PLMN) search procedure, wherein the PLMN search procedure includes a frequency scan based on the first indication or the second indication.

In still further exemplary embodiments, an integrated circuit is provided. The integrated circuit includes circuitry configured to receive a signal broadcast by a cell of a new radio (NR) network, circuitry configured to decode the signal to determine whether the cell is configured for a standalone (SA) operation for NR, circuitry configured to store a first indication locally at the UE that the cell is configured for the SA operation for NR when the cell is configured for the SA operation for NR, circuitry configured to store a second indication locally at the UE that the cell is configured for a non-standalone (NSA) operation for NR when the cell is not configured for the SA operation for NR and circuitry configured to initiate a public land mobile network (PLMN) search procedure, wherein the PLMN search procedure includes a frequency scan based on the first indication or the second indication.

BRIEF DESCRIPTION OF THE DRAWINGS

FIG. 8*b* shows a signaling diagram for the UE to transition between the RRC idle state to RRC connected state based on MIB when both SA and NSA capable cells are present.

FIG. 9 shows a signaling diagram for generating a measurement report that does not include SA cells.

DETAILED DESCRIPTION

Figure 1:
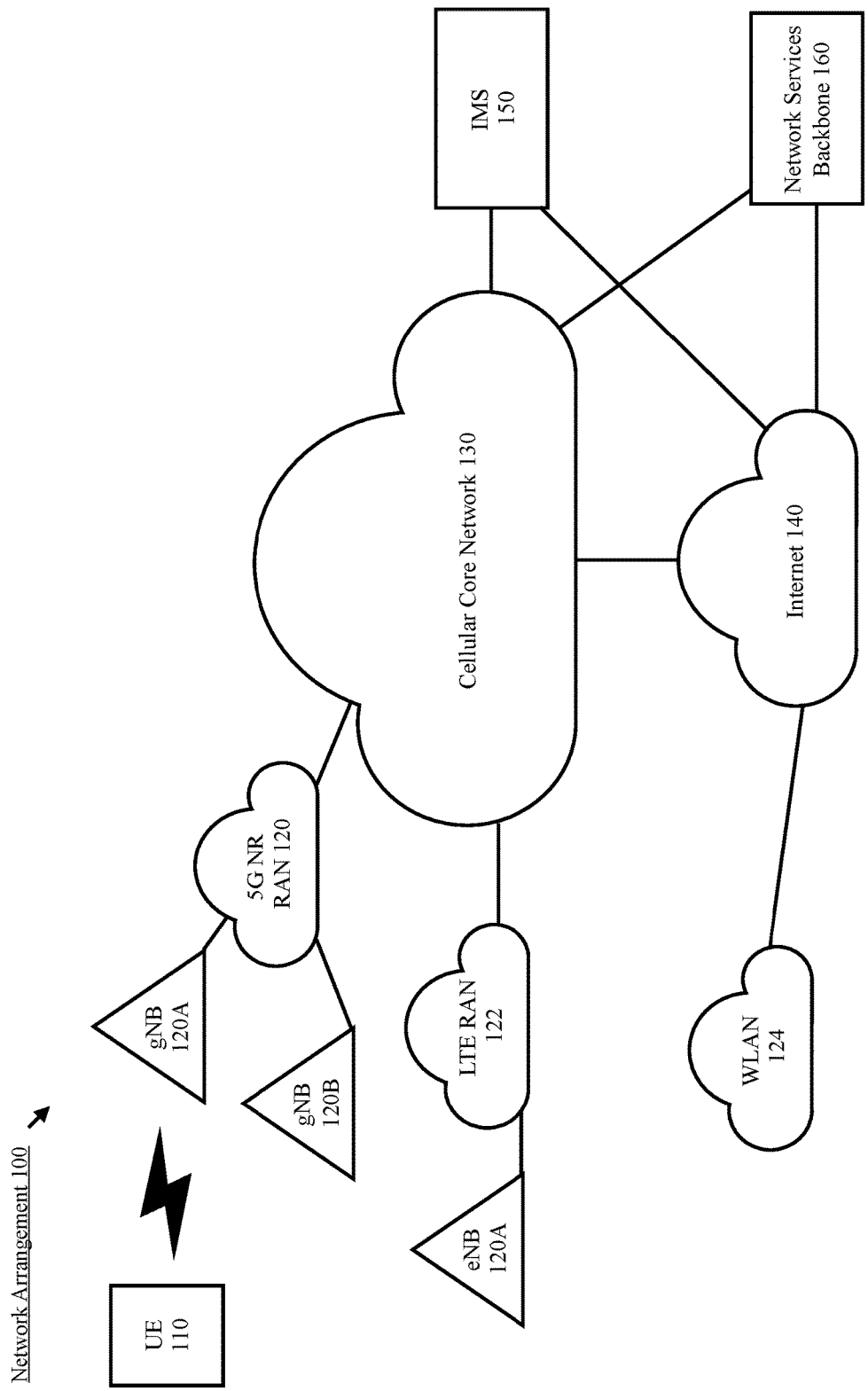
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to public land mobile network (PLMN) selection.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

The exemplary embodiments are also described with regard to 5G new radio (NR) radio access technology (RAT). The UE may access 5G NR services when operating in non-standalone (NSA) mode for 5G or standalone (SA) mode for 5G. In NSA mode, the UE may be configured with a simultaneous connection to both 5G NR RAT and LTE RAT (e.g., dual connectivity). Those skilled in the art will understand that dual connectivity generally refers to a UE that is configured to communicate with cells associated different RATs. For example, when in NSA mode for 5G, the UE may achieve dual connectivity via a master cell group (MCG) corresponding to LTE and a secondary cell group (SCG) corresponding to 5G NR or vice versa. Each cell group may include at least one cell for a corresponding RAT.

Thus, when operating in NSA mode for 5G, the UE may have a simultaneous connection to 5G NR and LTE.

In SA mode for 5G, the UE may connect to one RAT at a particular time. During operation, the network connection may transition between different RATs (e.g., 5G NR, LTE, Legacy, etc.). For example, at a first time, the network connection may use 5G NR RAT via at least one NR cell. Subsequently, the UE and/or the network may cause the UE to transition from 5G NR to LTE. Thus, at a second time, the network connection may use LTE RAT via at least one LTE cell. Thus, when operating in SA mode, the UE may use one RAT at a time for the network connection.

The exemplary embodiments relate to a UE operating in SA mode and performing PLMN selection. PLMN selection generally relates to the UE identifying one or more PLMNs providing service to the UE's geographic location and selecting an appropriate PLMN from the set of identified PLMNs. A PLMN may include multiple different RATs and multiple cells that support different types of functionality. For example, a PLMN may include 5G NR RAT with one or more 5G NR cells that support SA functionality and one or more 5G NR cells that only support NSA functionality. PLMN selection may also include selecting a cell of the PLMN to camp on. Thus, a UE operating in SA mode and performing PLMN selection may perform operations related to identifying whether a cell of a PLMN supports SA functionality.

In some exemplary embodiments the UE may identify whether a 5G NR cell supports SA functionality based on the contents of a system information block (SIB) broadcast by the 5G NR cell. For instance, a 5G NR Cell may broadcast a SIB1 that is configured to be used by the UE for synchronization. If the SIB1 includes a tracking area code, the UE may assume that the cell supports SA functionality. Alternatively, the absence of the tracking area code in the SIB1 may indicate to the UE that the cell only supports primary secondary cell (PSCell)/secondary cell (SCell) functionality for the PLMN identified in the SIB1. Those skilled in the art will understand that a PSCell and a SCell are associated with a SCG and thus, NSA functionality. In other words, the UE may assume that a 5G NR cell only supports NSA functionality if the SIB1 broadcast by that 5G NR cell does not include a tracking area code.

The exemplary embodiments are described with regard to maintaining and utilizing a database that may be used by the UE during PLMN selection. Throughout this description, this database may be referred to as a "SA PLMN database." This database may be configured to include one or more PLMN identities. For each PLMN identity, the database may include one or more cell identities. For each cell identity, the database may include an indication as to whether this cell identity supports SA functionality. As will be explained in detail below, at a first time, the UE may collect this type of information for a geographical area and then store it in the SA PLMN database. When the UE returns to the geographical area at a second time, the UE may use this database to target certain 5G NR cells and/or frequencies. However, reference to the term SA PLMN database is merely provided for illustrative purposes, different entities may refer to a similar concept by a different name.

In a first aspect, the exemplary embodiments relate to managing the SA PLMN database. As indicated above, this may include determining whether a particular cell supports SA functionality. In a second aspect, the exemplary embodiments relate to utilizing the SA PLMN database and other exemplary techniques for PLMN selection. In a third aspect, the exemplary embodiments relate to utilizing the SA PLMN database and other exemplary techniques to transition from a lower RAT connection to a 5G NR connection. In a fourth aspect, the exemplary embodiments relate to differentiating between SA cells and NSA cells without utilizing the SIB1. Specific examples of each of these exemplary aspects will be described in more detail below.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A. The gNB 120A may be configured with the necessary hardware, software and/or firmware to perform massive multiple in multiple out (MIMO) functionality. Massive MIMO may refer to a base station that is configured to generate a plurality of beams for a plurality of UEs. During operation, the UE 110 may be within range of a plurality of gNBs. Thus, either simultaneously or alternatively, the UE 110 may also connect to the 5G NR-RAN 120 via the gNB 120B. Reference to two gNBs 120A, 120B is merely for illustrative purposes. The exemplary embodiments may apply to any appropriate number of gNBs. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
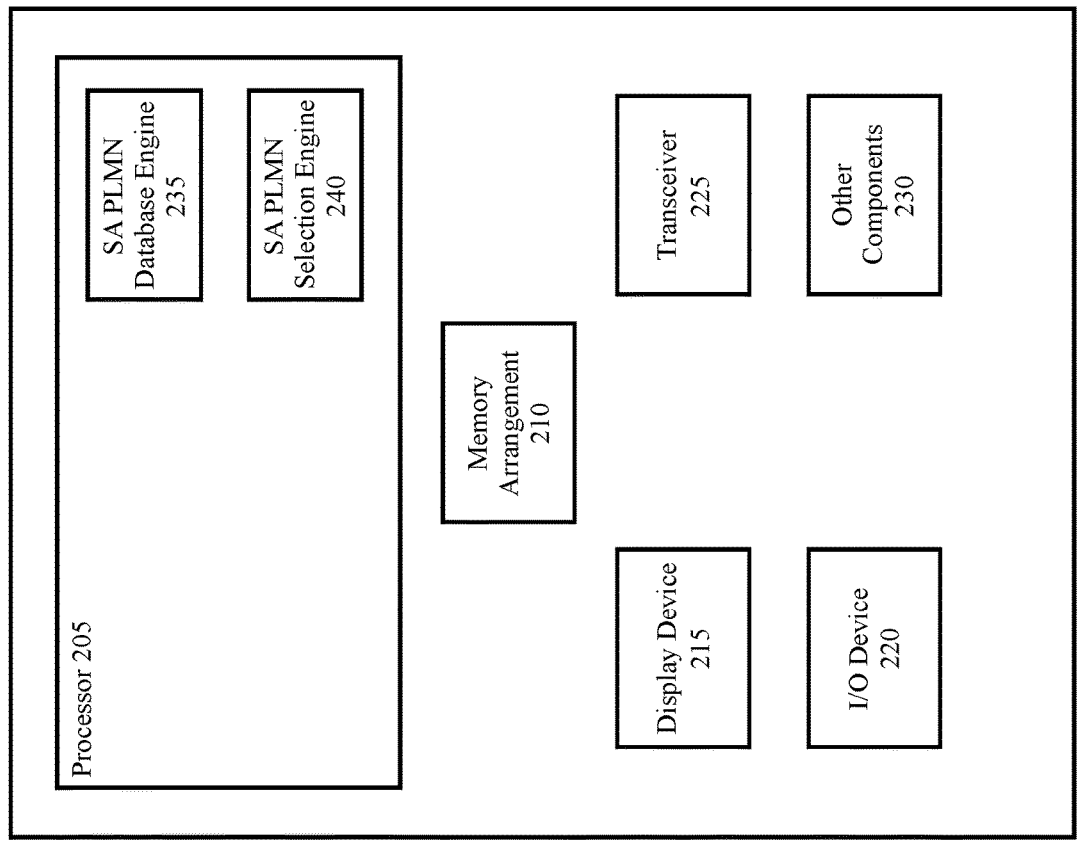
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc.

The processor 205 may be configured to execute a plurality of engines of the UE 110. For example, the engines may include a SA PLMN database engine 235 and a SA PLMN selection engine 240. The SA PLMN database engine 235 may be configured to manage the SA PLMN database stored locally at the UE 110. This may include populating entries within the database to indicate whether a particular cell identity supports SA functionality. The SA PLMN selection engine may be configured to utilize the SA PLMN database and other techniques during PLMN selection and reselection procedures.

The above referenced engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
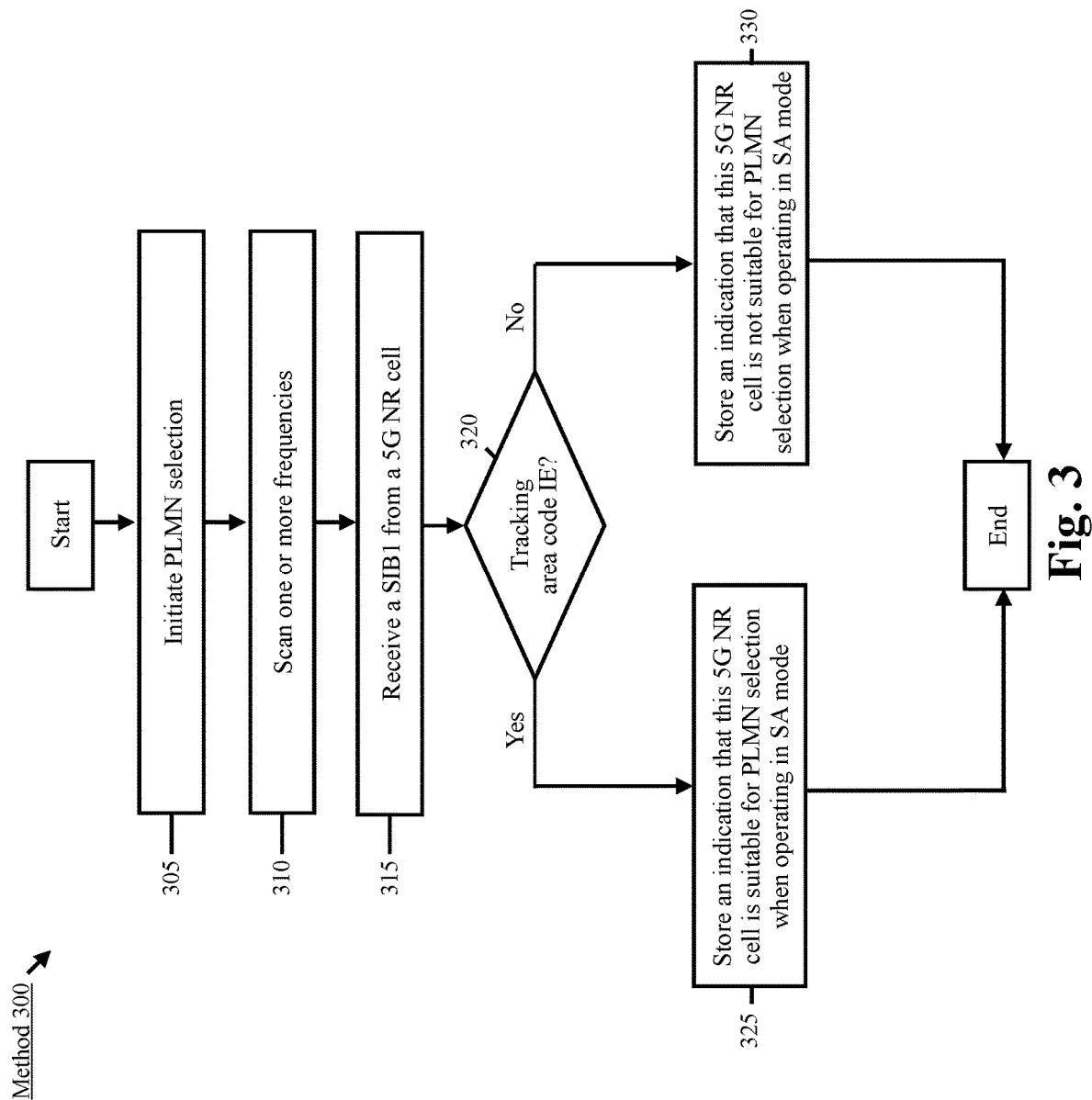
FIG. 3 shows a method for maintaining the standalone (SA) public land mobile network (PLMN) database according to various exemplary embodiments.

FIG. 3 shows a method 300 for maintaining the SA PLMN database according to various exemplary embodiments. The method 300 will be described with regard to the network arrangement 100 of FIG. 1 and the UE 110 of FIG. 2. The method 300 provides a general overview of how the UE 110 may maintain the SA PLMN database. Example of how the UE 110 may utilize the SA PLMN database for PLMN selection will be described after the description of the method 300.

In 305, the UE 110 initiates PLMN selection. Those skilled in the art will understand that PLMN selection may be initiated for any of a variety of different reasons. To provide an example, the UE 110 may perform PLMN selection in response to a power cycle of the UE 110 and/or the baseband processor, an airplane mode toggle, an out-of-service (OOS) state, etc. However, the exemplary embodiments are not limited to initiating PLMN selection for any particular reason and may apply whenever the UE 110 is triggered to perform PLMN selection or reselection.

In 310, the UE 110 scans one or more frequencies. For example, the UE 110 may tune the transceiver 225 to listen for information broadcast by cells that may be used by the UE 110 to establish a network connection.

As indicated above, information related to PLMN selection may be included in a SIB1. Those skilled in the art will understand that the UE 110 may perform one or more synchronization operations prior to being able to receive the SIB1. For example, when tuned to a frequency the UE 110 may receive various signals over the air. If a cell is operating on the currently tuned frequency, it may broadcast various types of synchronization signals such as a master information block (MIB) over a physical broadcast channel (PBSCH). The MIB may include, in part, control information that allows the UE 110 to receive other synchronization signals broadcast by the cell such as the SIB1. Thus, scanning the one or more frequencies may include, at least in part, processing signals received over the air and determining whether synchronization signals have been broadcast by a cell.

In 315, the UE 110 receives a SIB1 from a 5G NR cell. For example, the UE 110 may receive a SIB1 broadcast by the gNB 120A. As will be described in greater detail below, the UE 110 may store an indication as to whether this 5G NR cell supports SA functionality based on the contents of the SIB1.

In 320, the UE 110 determines whether the SIB1 includes a tracking area code information element (IE). As indicated above, the tracking area code may indicate to the UE 110 whether the 5G NR cell supports SA functionality or only NSA functionality. If the SIB1 includes the tracking area code IE, the method 300 continues to 325.

In 325, the UE 110 stores an indication that this 5G NR cell is suitable for PLMN selection when operating in SA mode. The SA PLMN database may include one or more PLMN identities (e.g., PLMN ID or any other appropriate indication). For each PLMN identity, the database may include one or more cell identities (e.g., a cell ID or any other appropriate indication) and for each cell identity the database may include an indication as to whether the cell supports SA functionality. For example, the UE 110 may populate a field within the SA PLMN database with a "1" to indicate that the cell ID associated with the gNB 120A supports SA functionality (e.g., the gNB 120A broadcasts a tracking area code within the SIB1).

Returning to 320, if the SIB1 does not include the tracking area code IE, the method 300 continues to 330. In 330, the UE 110 stores an indication that this 5G NR cell is not suitable for PLMN selection when operating in SA mode. For example, the UE 110 may populate a field within the SA PLMN database with a "0" to indicate that the cell ID associated with the gNB 120A does not support SA functionality (e.g., the gNB 120A did not broadcast a tracking area code within the SIB1). However, reference to storing a "1" or a "0" is merely provided for illustrative purpose, the exemplary embodiments may apply to storing any appropriate indication.

The method 300 was described with regard to the UE 110 receiving a SIB1 from a single cell. However, during an actual PLMN selection procedure, the UE 110 may receive information broadcast by multiple cells. Thus, the method 300 may be performed for multiple SIB1s.

The SA PLMN database is described herein as a single database. However, in an actual configuration, the type of information stored in the SA PLMN database may be stored in multiple types of databases. Thus, reference to the SA PLMN database may identify one or more different databases stored locally at the UE 110. Different entities may refer to these databases by different names. For example, some entities may refer to this type of database as an acquisition (ACQ) database or a APACs database. The exemplary embodiments are not limited to any particular number or type of database and the exemplary techniques herein may be applicable to any appropriate type of one or more databases.

Figure 4:
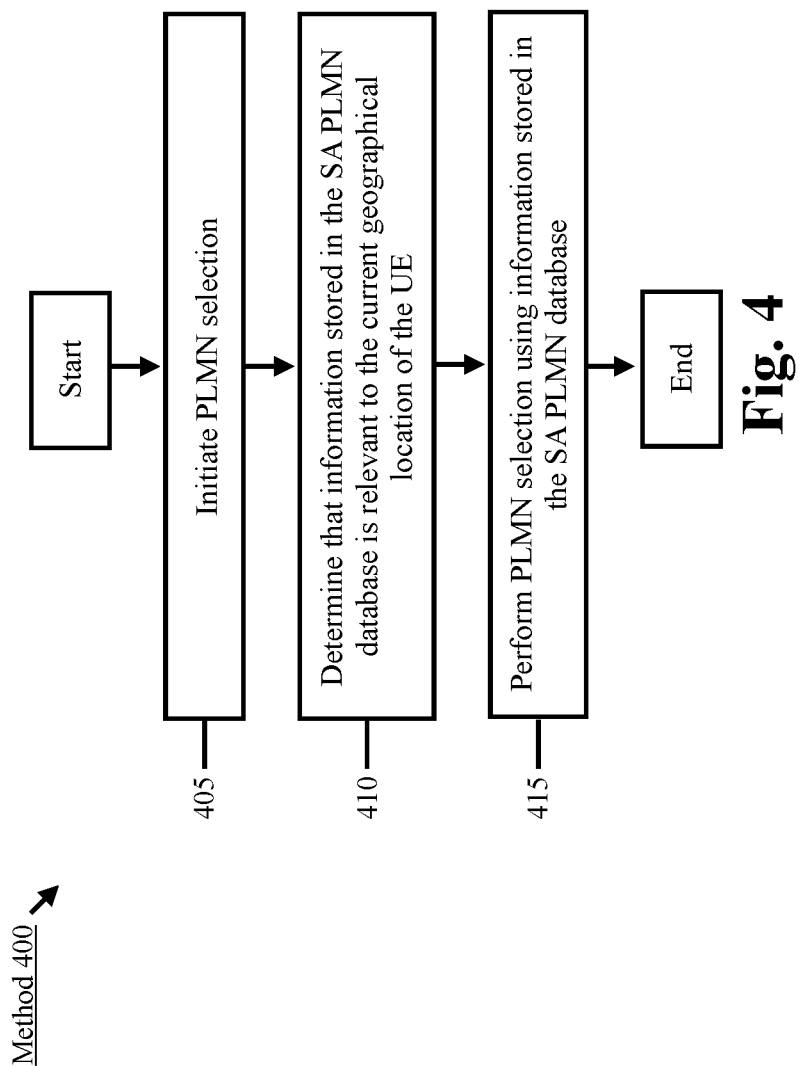
FIG. 4 shows a method for utilizing the SA PLMN database for PLMN selection according to various exemplary embodiments.

FIG. 4 shows a method 400 for utilizing the SA PLMN database for PLMN selection according to various exemplary embodiments. The method 400 will be described with regard to the network arrangement 100 of FIG. 1, the UE 110 of FIG. 2 and the method 300 of FIG. 3.

In 405, the UE 110 initiates PLMN selection. This is substantially similar to 305 of the method 300.

In 410, the UE 110 determines that information stored in the SA PLMN database is relevant to the current geographical location of the UE 110. For example, the SA PLMN database may also include an indication of a geographical location that may be served by a particular PLMN and/or particular 5G NR cell. The UE 110 may determine that information stored in the SA PLMN database is relevant to the current geographical location of the UE 110 based on the information stored in the SA PLMN database and global positioning system (GPS) information (or any other appropriate type of location information) for the UE 110.

Although not shown in FIG. 4, if the UE 110 determines that the information stored in SA PLMN database is not relevant to the current geographical location of the UE 110, the UE 110 may still update the SA PLMN database in accordance with the method 300. Thus, if the UE 110 were to return to this geographical location at a subsequent time, the UE 110 would then be able to utilize the SA PLMN database in accordance with the method 400.

In 415, the UE 110 may perform PLMN selection using information stored in the SA PLMN database. For example, the UE 110 may perform a scan and prioritize frequencies corresponding to 5G NR cells that UE 110 has previously determined support SA functionality. In another example, the UE 110 may omit scanning particular frequency bands or frequency ranges that the UE 110 has already determined are not associated with cells that support SA functionality. Thus, the UE 110 may reduce the latency associated with the PLMN search because the UE 110 targets frequency bands associated with 5G NR cells that the UE 110 has already determined support SA functionality. Subsequently, the method 400 ends.

Figure 5:
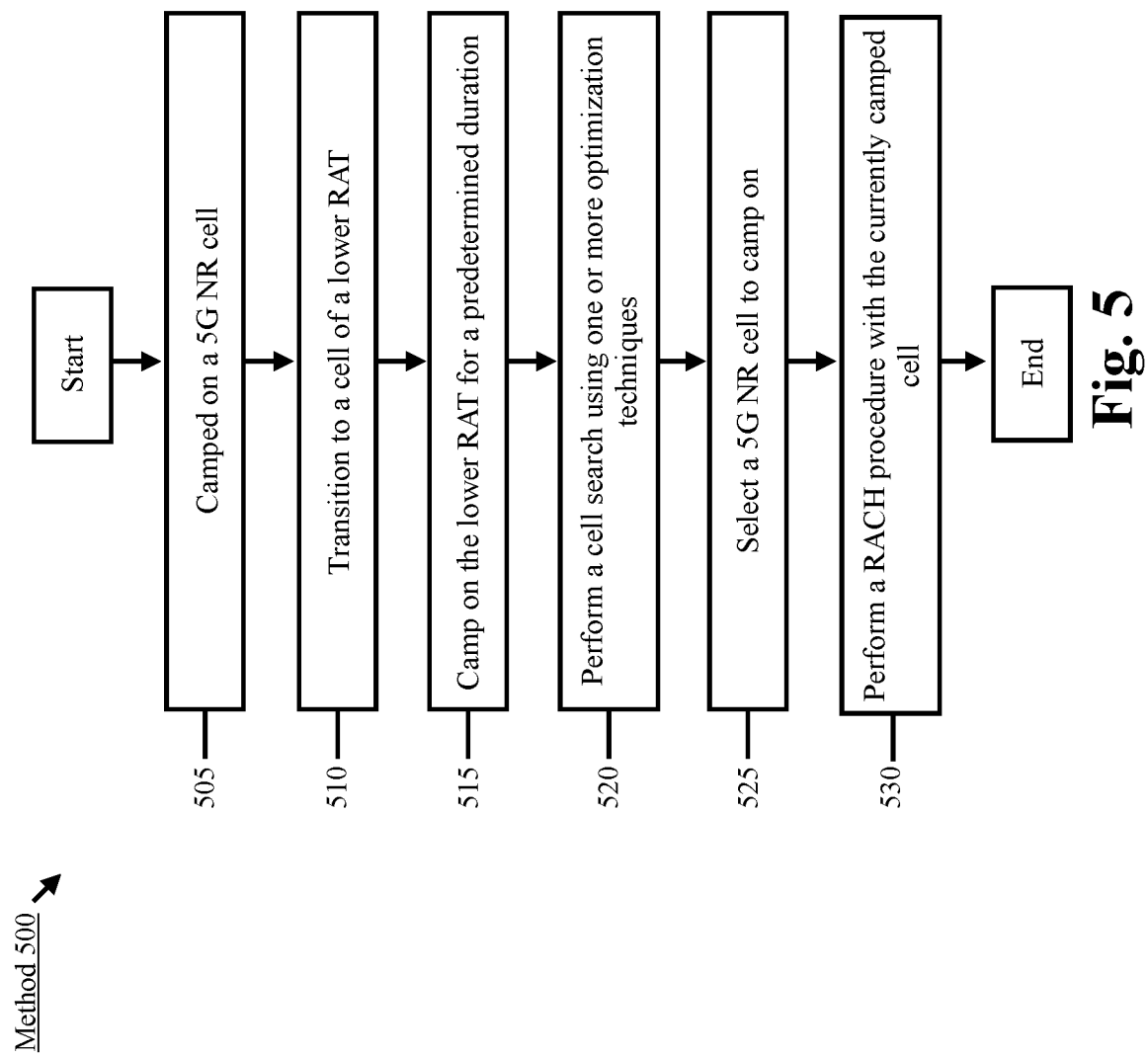
FIG. 5 shows a method for implementing various techniques for PLMN selection when camped on a radio access technology (RAT) lower than 5G new radio (NR) according to various exemplary embodiments.

FIG. 5 shows a method 500 for implementing various techniques for PLMN selection when camped on a RAT lower than 5G NR according to various exemplary embodiments. The method 500 will be described with regard to the network arrangement 100 of FIG. 1, the UE 110 of FIG. 2 and the method 300 of FIG. 3.

In 505, the UE 110 is camped on a 5G NR cell that supports SA functionality. In 510, the UE 110 transitions to a cell of a lower RAT. In this example, the UE 110 transitions to an LTE cell (e.g., eNB 122A). However, the exemplary embodiments would also apply to the UE 110 transitioning to a legacy RAT (e.g., 3G, 2G, etc.) in 510.

In 515, the UE 110 determines that the UE 110 has been camped on the lower RAT for a predetermined duration. The lower RAT may not provide the same type network services and use cases as 5G NR. Thus, the UE 110 initiates PLMN selection in an attempt to camp on a 5G NR cell that supports SA functionality so the UE 110 can return to receiving the full scope of services normally available to the UE 110 via the network connection. The predetermined duration may be based on any of a variety of different factors such as, but not limited to, the type of network services the UE 110 is configured to utilize, the type of operations the UE 110 is configured to perform, information received from the network, user input at the UE 110, etc.

In 520, the UE 110 may perform a PLMN search using one or more techniques. One technique may include performing a scan using the SA PLMN database to find a suitable 5G NR cell that supports SA functionality at the current geographical location of the UE 110. As indicated above with regard to the method 400, this may include prioritizing 5G NR cells that the UE 110 has already determined are suitable for PLMN selection at this location and/or omitting frequency bands/ranges from the scan that the UE 110 has already determined are not suitable for PLMN selection at this location. Another technique may include performing a scan based on NR frequency priority indicated in an LTE SIB24.

In 525, the UE 110 may select a 5G NR cell to camp on. The UE 110 may select a 5G NR Cell based on any appropriate selection criteria. In 530, the UE 110 may perform a random access channel (RACH) procedure on the currently camped cell to register with a network that supports 5G SA functionality. Subsequently, the method 500 ends.

Figure 6:
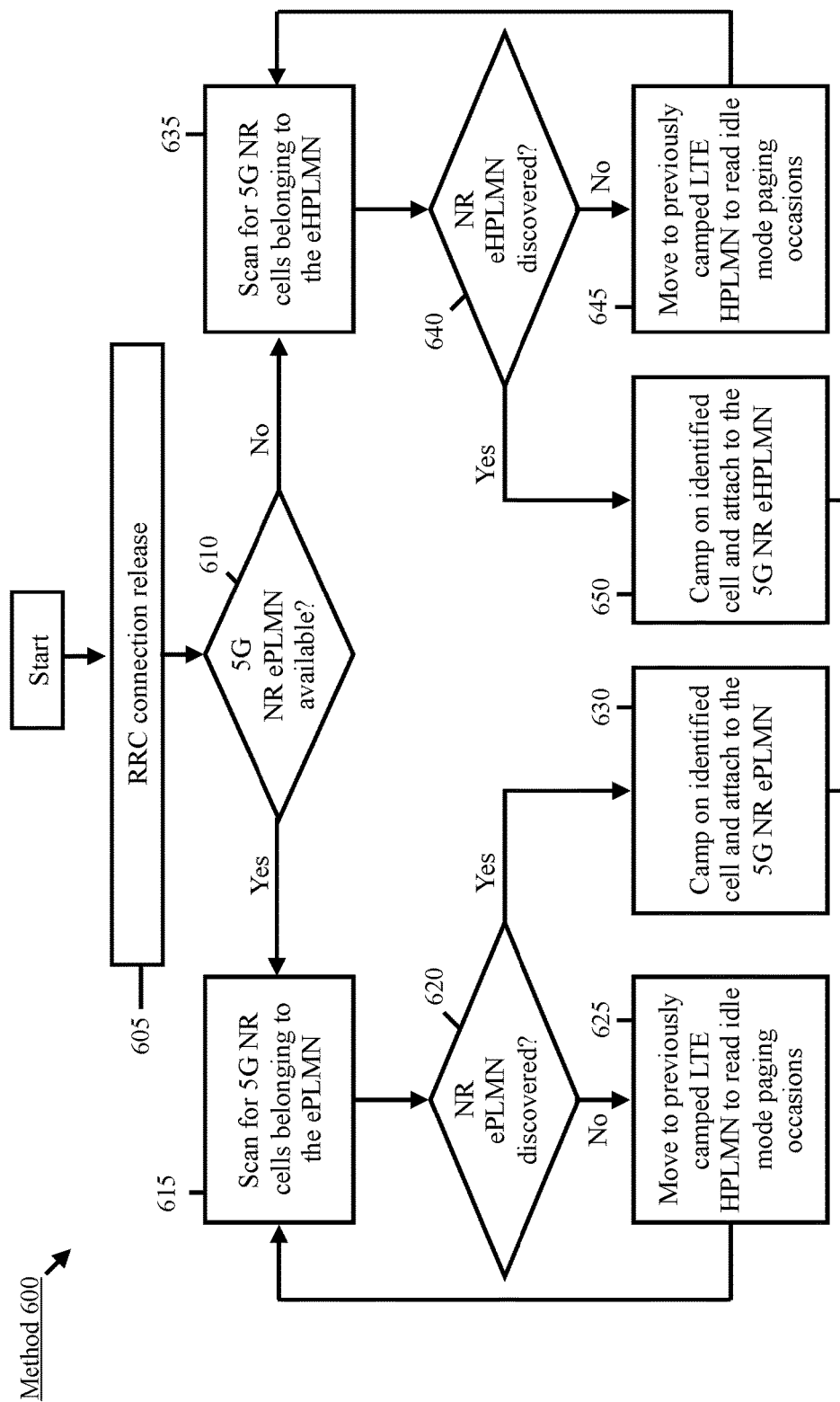
FIG. 6 shows a method for transitioning from a currently camped LTE HPLMN to an 5G NR equivalent PLMN (ePLMN) or a 5G NR equivalent home PLMN (eHPLMN) according to various exemplary embodiments.

FIG. 6 shows a method 600 for transitioning from a currently camped LTE HPLMN to an 5G NR equivalent PLMN (ePLMN) or a 5G NR equivalent home PLMN (eHPLMN) according to various exemplary embodiments. The method 600 will be described with regard to the network arrangement 100 of FIG. 1, the UE 110 of FIG. 2 and the method 300 of FIG. 3.

Initially, consider the following exemplary scenario, the UE 110 is attached to an LTE RAT of the HPLMN. The UE 110 is configured with a 5G NR ePLMN and/or a 5G NR equivalent home PLMN (eHPLMN). Those skilled in the art will understand the an ePLMN is provided to the UE 110 via network signaling and the eHPLMN may be stored in the universal subscriber identity module (USIM). Thus, the difference between the eHPLMN and ePLMN, at least in part, is how it is provisioned to the UE 110.

In this example, the UE 110 is connected to the LTE RAT 122 for an extended duration. It should also be considered that in the course of normal operation there may be various mechanisms that cause the UE 110 to transition from the currently camped RAT to 5G NR. For example, the network may trigger handover from LTE to 5G NR. The method 600 relates to a scenario in which these mechanisms do not cause the UE 110 to transition to 5G NR. Thus, despite being capable of accessing 5G NR SA services, the UE 110 in this example is stuck camping on the LTE HPLMN.

In 605, the UE 110 initiates a radio resource control (RRC) connection release. This allows the UE 110 to initiate PLMN reselection.

In 610, the UE 110 determines whether 5G NR ePLMN is available. As indicated above, the 5G NR ePLMN may be provided to the UE 110 via network signaling. For example, the UE 110 may have previously received the 5G NR ePLMN in a tracking area update accept message, an attach accept message or a routing area update accept message on a circuit switch (CS) RAT. If a 5G NR ePLMN is available, the method 600 continues to 615.

In 615, the UE 110 considers the ePLMN a higher priority PLMN and then scans for 5G NR cells belonging to the ePLMN. The scan may be performed after the RRC connection release and then based on a subscriber identity module (SIM) scan timer, e.g., 2 minutes, 6 minutes and then incremented accordingly. The scan may be for a system synchronization block (SSB) and should not overlap with idle mode paging duration. In some embodiments, a burst scan may be performed on the center of frequency based on information provided by the carrier and/or an absolute frequency based on information provided in the carrier bundle. Due to the high bandwidths that 5G networks are operating on, there may be a low probability of a carrier having different frequencies in the same band. Thus, the UE 110 may limit the SSB burst search to specific frequencies in the NR band for SA instead of a full band scan. Similarly, in some embodiments, the burst scan may be performed on frequencies indicated in the SA PLMN database.

In 620, the UE 110 determines whether the NR ePLMN was discovered in the scan. If the NR ePLMN is not discovered in the scan, the method 600 continues to 625 where the UE 110 moves back to the previously camped LTE HPLMN to read idle mode paging occasions. Subsequently, the method returns to 615 to perform the search again. If the NR ePLMN is discovered, the method may continue to 630 where UE 110 may camp on identified cell and attached to the 5G NR ePLMN.

Returning to 610, if a 5G NR ePLMN is not available, the method 600 continues to 635. In 635, the UE 110 scans for 5G NR cells belonging to the eHPLMN. The scan may be performed after the RRC connection release and may utilize a timer similar to the timer described in 615. Further, as described in 615, the scan may be for SSB, may not overlap with an idle mode paging duration and the UE 110 may limit the SSB burst search to specific frequencies in the NR band for SA instead of a full band scan.

In 640, the UE 110 determines whether the NR eHPLMN was discovered in the scan. If the NR eHPLMN is not discovered in the scan, the method 600 continues to 645 where the UE 110 moves back to the LTE HPLMN to read idle mode paging occasions. Subsequently, the method returns to 635 to perform the search again. If the NR eHPLMN is discovered, the method may continue to 650 where UE 110 may camp on the identified cell and attached to the 5G NR eHPLMN. Subsequently, the method 600 ends.

Figure 7:
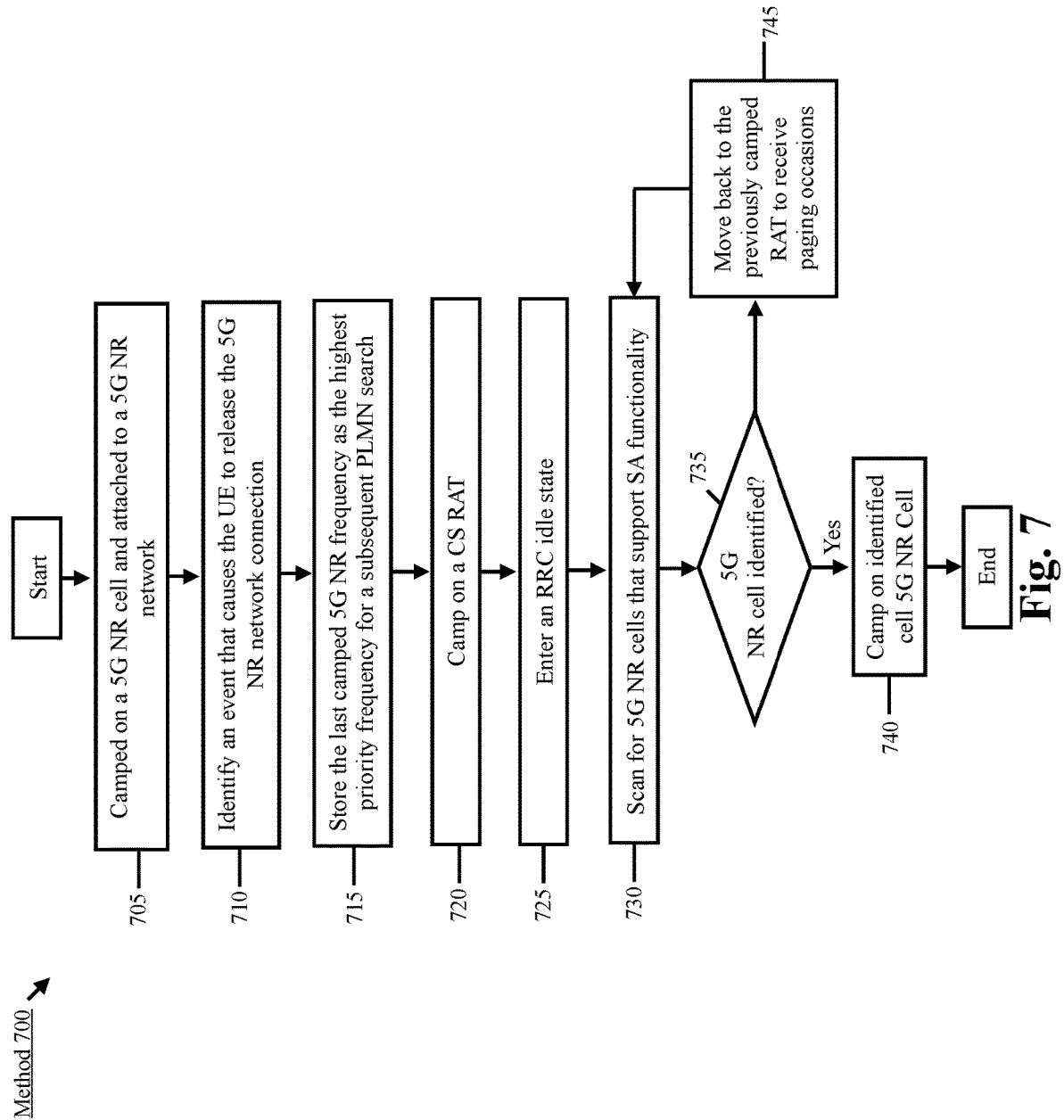
FIG. 7 shows a method 700 for performing a PLMN search when the UE 110 is camped on a circuit switched (CS) RAT according to various exemplary embodiments.

FIG. 7 shows a method 700 for performing a PLMN search when the UE 110 is camped on a circuit switched (CS) RAT according to various exemplary embodiments. The method 700 will be described with regard to the network arrangement 100 of FIG. 1, the UE 110 of FIG. 2 and the method 300 of FIG. 3.

In 705, the UE 110 is camped on a 5G NR cell and attached to a 5G NR network. For example, the UE 110 may be camped on the gNB 120A and operating in SA mode.

In 710, the UE 110 identifies an event that causes the UE 110 to release the 5G NR network connection. For example, the UE 110 may experience a power cycle, an airplane mode toggle, a circuit switched fallback (CSFB), etc. The above examples are merely provided for illustrative purposes, the exemplary embodiments are not limited to the UE 110 releasing the 5G NR connection for any particular reason and may apply to any appropriate scenario.

In 715, the UE 110 stores the last camped 5G NR frequency as the highest priority frequency for a subsequent PLMN search. Since the UE 110 was previously able to receive service on this NR frequency, the UE 110 may look to camp on this frequency to receive NR service in a fast and efficient manner. This indication may be saved in the SA PLMN database and/or another portion of the memory arrangement 210.

In 720, the UE 110 camps on a circuit switched (CS) RAT. For example, if the event in 710 was CSFB, then the UE 110 may be currently camped on the CS RAT. However, if the event in 710 was a power cycle or an airplane mode toggle, then the UE 110 may have to search for and the camp on a CS cell. The method 700 relates to the UE 110 transitioning from being camped on the CS RAT to a 5G NR cell that supports SA functionality. Thus, in this exemplary scenario the following conditions are assumed. One assumption is that the SIM HPLMN selector with access technology (HPLMNwAcT) does not specify a 5G NR search. The HPLMNwAcT contains a set of HPLMN codes with a specified RAT, this allows the UE 110 to perform targeted PLMN searches. If the HPLMNwAcT specifies the 5G NR search, then the UE 110 may perform a search for the 5G NR prior to deciding to camp on the CS cell. Another assumption is that LTE is not available to camp on. If LTE were available to camp on, the UE 110 may camp on the LTE cell and then perform the methods 500 or 600 to transition from an LTE cell to the 5G NR cell.

In 725, the UE 110 enters an RRC idle state. For example, if the UE 110 transitioned to the CS RAT in accordance with CSFB, the service that was utilizing CSFB may have ended. Thus, the UE 110 may transition to the RRC idle state after the CS service has been utilized for its intended purpose. To enter RRC idle state, the UE 110 may utilize a signaling connection release indication (SCRI). However, as indicated above in 710, there may be scenarios where the UE 110 camps on the CS RAT after a power cycle or an airplane mode toggle. In this type of scenario, the UE 110 may camp on the CS RAT in RRC idle state to receive service while searching for the 5G NR RAT.

In 730, the UE 110 may perform a scan for 5G NR cells that support SA functionality. This procedure may prioritize the previously camped NR frequency and/or other cells from the SA PLMN database. This scan for SSBs may be a burst scan performed after the RRC connection release, then in increments similar to the SIM scan timer referenced in 615. Further, this scan may not interfere with idle mode paging activities.

In 735, the UE 110 determines whether a 5G NR cell that supports SA functionality has been identified. If a cell is identified, the method 700 continues to 740 where the UE 110 camp on the 5G NR cell that supports SA functionality. Subsequently, the method 700 ends.

Returning to 735, if no cell has been identified, the method 700 may continue to 745. In 745, the UE 110 may move back to the last camped RAT to receive paging occasions. The method 700 then returns to 730 where the scan for 5G NR cells that support SA functionality is performed.

As mentioned above, one aspect of the exemplary embodiments is a mechanism configured to differentiate between 5G NR cells that support SA functionality and 5G NR cells that only support NSA functionality that does not rely on SIB1.

The exemplary embodiments relate to utilizing a master information block (MIB) to differentiate between SA cells and NSA cells. Utilizing the MIB instead of the SIB reduces latency because the UE 110 does not have to wait to receive the SIB1 and process the SIB1 to determine whether the corresponding cell supports SA or NSA. This allows devices configured for ultra-reliable low latency communication (URLLC) use cases to satisfy the low latency requirements when performing Registration procedure or during cell reselection or moving from RRC idle state to RRC connected state.

Figure 8A:
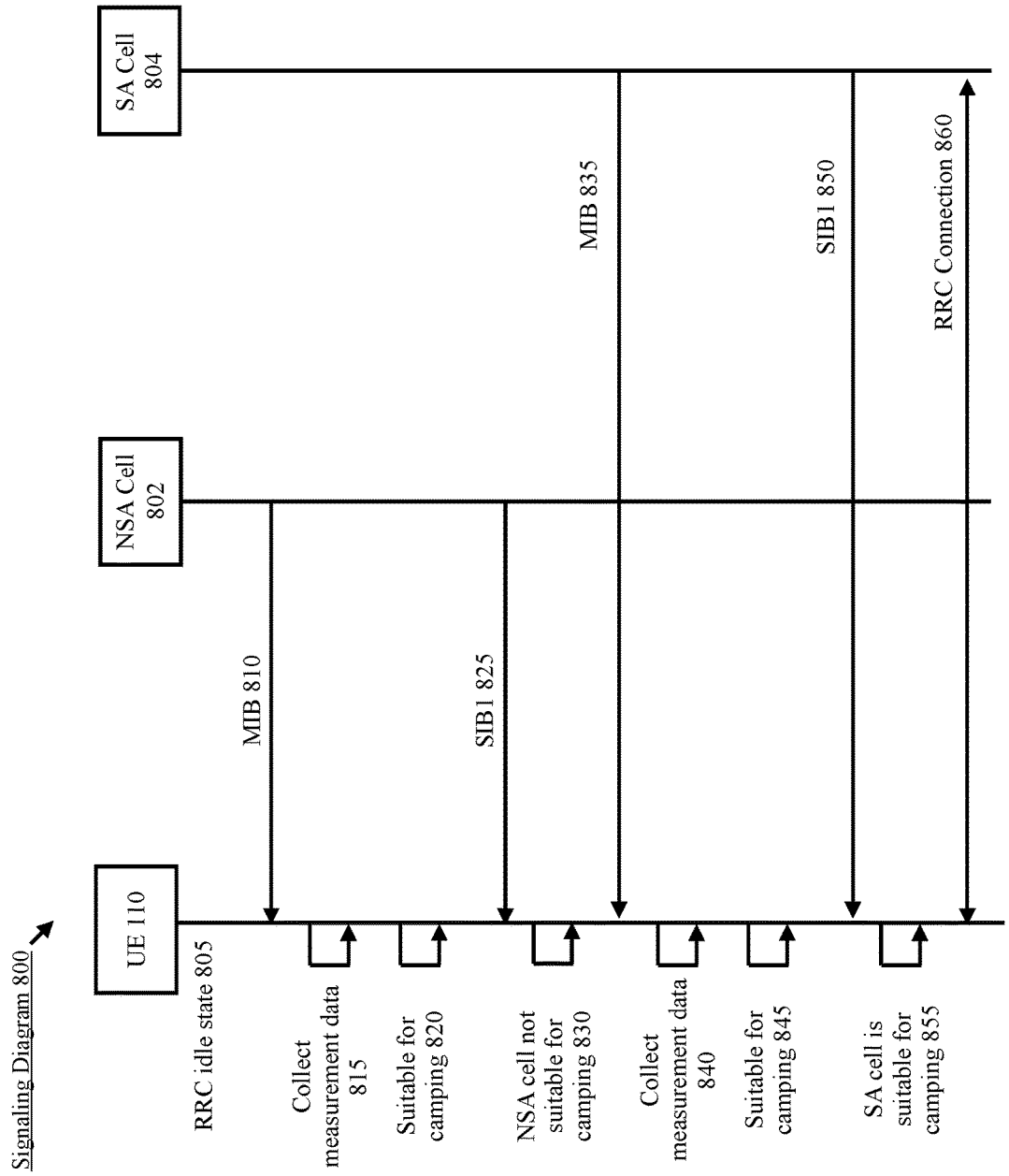
FIG. 8*a* shows a signaling diagram for the UE to transition between the RRC idle state to RRC connected state based on SIB 1 when both SA and NSA capable cells are present.

FIGS. 8a-8b show how utilizing an MIB to distinguish between SA and NSA capable cells may reduce latency when moving from an RRC idle state to the RRC connected state. FIG. 8a shows a signaling diagram 800 for the UE 110 to transition between the RRC idle state to RRC connected state based on SIB 1 when both SA and NSA capable cells are present.

The signaling diagram 800 includes the UE 110, an NSA cell 802 and a SA cell 804. In this example the UE 110 is configured as an URLLC device which means that the UE 110 is configured to operate in SA mode.

In 805, the UE 110 is operating in the RRC idle state. While in the RRC idle state, the UE 110 tunes the transceiver 225 to various frequencies to listen for information transmitted by cells within the vicinity of the UE 110.

In 810, the UE 110 receives a MIB from the NSA cell 802 over a physical broadcast channel (PBCH). In 815, the UE 110 collects measurement data corresponding to the NSA cell 802. In 820, the UE 110 determines that the NSA cell 802 is suitable for camping based on the measurement data. At this time, the UE 110 does not know that the NSA cell 802 is an NSA cell.

In 825, the UE 110 receives a SIB1 from the NSA cell 802. In 830, the UE 110 determines that the NSA cell 802 only supports NSA functionality. As mentioned above, the UE 110 may make this determination based on the absence of a tracking area code in the SIB1. Since the UE 110 is operating in SA mode, the NSA cell 802 is not to be used for the RRC connection. Thus, the UE 110 remains in the RRC idle state and continues to search for a SA capable cell.

In 835, the UE 110 receives a MIB from the SA cell 804 over a physical broadcast channel (PBCH). In 840, the UE 110 collects measurement data corresponding to the SA cell 804. In 845, the UE 110 determines that the SA cell 804 is suitable for camping based on the measurement data. At this time, the UE 110 does not know that the SA cell 804 is a SA cell. In 850, the UE 110 receives a SIB1 from the SA cell 804. In 855, the UE 110 determines that the SA cell 804 supports SA functionality. In 860, the UE 110 established an RRC connection with the SA cell 840.

FIG. 8b shows a signaling diagram 865 for the UE 110 to transition between the RRC idle state to RRC connected state based on MIB when both SA and NSA capable cells are present.

Like the signaling diagram 800, the signaling diagram 865 includes the UE 110, the NSA cell 802 and the SA cell 804. In this example the UE 110 is configured as an URLLC device which means that the UE 110 is configured to operate in SA mode.

In 870, the UE 110 is operating in the RRC idle state. While in the RRC idle state the UE 110 is tuning is transceiver to various frequencies to listen for information transmitted by cells within the vicinity of the UE 110.

In 875, the UE 110 receives a MIB from the NSA cell 802 over a PBCH. However, in this example, the MIB is configured to indicate whether the cell supports SA functionality. In some embodiments, the MIB spare bit is configured to include an indication as to whether the cell is SA capable or NSA capable, In other embodiments, the intra-frequency reselection bit is configured to indicate that cell reselection is not allowed when the cell that transmits the MIB is a NSA cell. The above examples are merely provided for illustrative purposes and may apply to the MIB include any appropriate indication as to whether the cell is SA or NSA capable.

In 880, the UE 110 ignores the NSA cell 802 based on receiving the MIB. A comparison to the signaling diagram 800 shows that the UE 110 in this example is able to determine that the NSA cell 802 is NSA capable and avoid the latency associated with collecting measurement data, receiving the SIB1 and processing the SIB1.

In 885, the UE 110 receives a MIB from the SA cell 804 over the PBCH. Since the MIB in this example is configured to include an indication that the cell is SA capable, the UE 110 is able to more quickly determine that the SA cell 804 is suitable for URLLC operations. In 890, the UE 110 collects measurement data corresponding to the SA cell 804. In this example, the measurement data indicates that the SA cell 804 is suitable for camping. In 895, the UE 110 establishes an RRC connection with the SA cell 804.

Utilizing the MIB in the manner described above may also provide benefits on the network side. For example, under conventional circumstance, a UE operating in NSA mode may be configured to measure both SA and NSA capable cells. However, the measurement report may not contain any distinguishing feature other than a physical cell ID (PCI). Since SA and NSA cells may have the same PCI, it makes it more difficult for the network to perform operations related to resource tacking and resource maintenance. By utilizing the MIB to distinguish between SA and NSA cells, the UE 110 may be able only include NSA cells in the measurement report.

FIG. 9 shows a signaling diagram 900 for generating a measurement report that does not include SA cells. The signaling diagram 900 includes the UE 110, the NSA cell 902 and the SA cell 904. In this example the UE 110 is operating in NSA mode and thus, it is unnecessary for the UE 110 to include SA capable cells in the measurement report.

In 905, the UE 110 receives a MIB over the PBCH from the NSA cell 902. Like in the signaling diagram 850, the MIB is configured to indicate whether the cell is SA capable or NSA capable. In 910, the UE 110 collects measurement data corresponding to the NSA cell 902. Since the UE 110 is able to determine that the NSA cell 902 supports NSA functionality, the UE 110 collects measurement data for the measurement report that is to be provided to the network.

In 915, UE 110 receives a MIB over the PBCH from the SA cell 904. In 920, the UE 110 ignores the SA cell 904. Since the UE 110 is operating in NSA mode and the SA cell 904 provides SA functionality, it is unnecessary for the UE 110 to include the SA cell 904 in the measurement report. In 925, the UE 110 provides a measurement report to the NSA cell 902. Utilizing the MIB in this manner may also reduce latency during a PLMN search since the UE 110 does not need to receive and process SIB1 to determine whether the corresponding cell supports SA or NSA functionality.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A non-transitory computer readable storage medium comprising a set of instructions, wherein the set of instructions when executed by a processor of a user equipment (UE) causes the processor to perform operations, comprising:
   receiving a signal broadcast by a cell of a new radio (NR) network;
   determining whether the cell is configured for a standalone (SA) operation for NR based on the received signal;
   determining a geographical location of the cell;
   when the cell is configured for the SA operation for NR, storing a first indication locally in a database at the UE that the cell is configured for the SA operation for NR and the geographical information for the cell, wherein the cell is associated with a first frequency band;
   when the cell is not configured for the SA operation for NR, storing a second indication locally in the database at the UE that the cell is configured for a non-standalone (NSA) operation for NR and the geographical information for the cell, wherein the cell is associated with a second frequency band; and
   initiating a public land mobile network (PLMN) search procedure, wherein the PLMN search procedure includes a frequency scan based on the first indication or the second indication stored in the database locally at the UE, wherein the frequency scan comprises scanning the first frequency band or the second frequency band associated with the cell.

2. The non-transitory computer readable storage medium of claim 1, wherein the signal is a system information block 1 (SIB1).

3. The non-transitory computer readable storage medium of claim 1, wherein the signal is a master information block (MIB) and determining whether the cell is configured for the SA operation for NR is based on a spare bit included in the MIB or an intra-frequency reselection bit included in the MIB.

4. The non-transitory computer readable storage medium of claim 1, wherein the frequency scan targets a frequency or a frequency range associated with the cell based on the first indication.

5. The non-transitory computer readable storage medium of claim 1, wherein the frequency scan does not scan one or more frequencies or a frequency range based on the second indication.

6. The non-transitory computer readable storage medium of claim 1, the instructions further comprising:
   camping on a previously camped radio access technology (RAT) to monitor for paging occasions.

7. The non-transitory computer readable storage medium of claim 1, the instructions further comprising:
   determining whether an equivalent PLMN (ePLMN) is available.

8. The non-transitory computer readable storage medium of claim 7, when the ePLMN is available, the frequency scan is for a cell of the ePLMN.

9. The non-transitory computer readable storage medium of claim 7, when the ePLMN is not available, the frequency scan is for a cell of a equivalent home PLMN (eHPLMN).

10. A user equipment (UE), comprising:
   a transceiver configured to communicate with one or more networks; and
   a processor configured to perform operations, the operations comprising:
      receiving a signal broadcast by a cell of a new radio (NR) network;
      decoding the signal to determine whether the cell is configured for a standalone (SA) operation for NR;
      determining a geographical location of the cell;
      when the cell is configured for the SA operation for NR, storing a first indication locally in a database at the UE that the cell is configured for the SA operation for NR and the geographical information for the cell, wherein the cell is associated with a first frequency band;
      when the cell is not configured for the SA operation for NR, storing a second indication locally in the database at the UE that the cell is configured for a non-standalone (NSA) operation for NR and the geographical information for the cell, wherein the cell is associated with a second frequency band; and
      initiating a public land mobile network (PLMN) search procedure, wherein the PLMN search procedure includes a frequency scan based on the first indication or the second indication stored in the database locally at the UE, wherein the frequency scan comprises scanning the first frequency band or the second frequency band associated with the cell.

11. The UE of claim 10, wherein the signal is a system information block 1 (SIB1).

12. The UE of claim 10, wherein the signal is a master information block (MIB).

13. The UE of claim 12, wherein determining whether the cell is configured for the SA operation for NR is based on a spare bit included in the MIB or an intra-frequency reselection bit included in the MIB.

14. The UE of claim 10, wherein the frequency scan targets a frequency associated with the cell based on the first indication.

15. The UE of claim 10, wherein the frequency scan does not scan one or more frequencies based on the second indication.

16. The UE of claim 10, the operations further comprising:
camping on a previously camped radio access technology (RAT) to monitor for paging occasions.

17. An integrated circuit, comprising:
circuitry configured to receive a signal broadcast by a cell of a new radio (NR) network;
circuitry configured to decode the signal to determine whether the cell is configured for a standalone (SA) operation for NR;
circuitry configured to determine a geographical location of the cell;
circuitry configured to store a first indication locally in a database at a user equipment (UE) that the cell is configured for the SA operation for NR when the cell is configured for the SA operation for NR and the geographical information for the cell, wherein the cell is associated with a first frequency band;
circuitry configured to store a second indication locally in the database at the UE that the cell is configured for a non-standalone (NSA) operation for NR when the cell is not configured for the SA operation for NR and the geographical information for the cell, wherein the cell is associated with a second frequency band; and
circuitry configured to initiate a public land mobile network (PLMN) search procedure, wherein the PLMN search procedure includes a frequency scan based on the first indication or the second indication stored in the database locally at the UE, wherein the frequency scan comprises scanning the first frequency band or the second frequency band associated with the cell.

18. The integrated circuit of claim 17, wherein the signal is a master information block (MIB) and wherein determining whether the cell is configured for the SA operation for NR is based on a spare bit included in the MIB or an intra-frequency reselection bit included in the MIB.

19. The integrated circuit of claim 17, wherein the frequency scan targets a frequency or a frequency range associated with the cell based on the first indication.

20. The integrated circuit of claim 17, wherein the frequency scan does not scan one or more frequencies or a frequency range based on the second indication.

* * * * *